United States Patent
Uddh et al.

(10) Patent No.: US 10,809,114 B2
(45) Date of Patent: Oct. 20, 2020

(54) SEALING DIELECTRIC FILLING MEMBER WITH MECHANICALLY REINFORCED ELEMENT

(71) Applicant: Rosemount Tank Radar AB, Mölnlycke (SE)

(72) Inventors: Rickard Uddh, Gothenburg (SE); Peter Elmberg, Molndal (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 177 days.

(21) Appl. No.: 16/020,277

(22) Filed: Jun. 27, 2018

(65) Prior Publication Data

US 2020/0003603 A1 Jan. 2, 2020

(51) Int. Cl.
*G01F 23/284* (2006.01)
*G01S 13/08* (2006.01)

(52) U.S. Cl.
CPC ............ *G01F 23/284* (2013.01); *G01S 13/08* (2013.01)

(58) Field of Classification Search
CPC .................................................... G01F 23/284
See application file for complete search history.

(56) References Cited

U.S. PATENT DOCUMENTS

| | | | | |
|---|---|---|---|---|
| 6,401,532 B2 * | 6/2002 | Lubbers | ................ | G01F 23/284 324/637 |
| 6,417,748 B1 * | 7/2002 | Lopatin | ................ | B29B 13/065 333/252 |
| 7,259,712 B1 * | 8/2007 | McKeen | ................ | G01F 23/284 324/644 |
| 7,864,104 B2 * | 1/2011 | Chen | ..................... | H01Q 13/02 342/124 |
| 9,291,492 B2 | 3/2016 | Fredriksson | | |
| 9,476,753 B2 * | 10/2016 | Georgescu | ................ | G01S 7/02 |
| 2002/0126061 A1 * | 9/2002 | Griessbaum | .......... | G01F 23/284 343/786 |
| 2004/0113853 A1 * | 6/2004 | Serban | .................. | G01F 23/284 343/703 |

(Continued)

OTHER PUBLICATIONS

Rubrice, Kevin et al. "Dielectric Characteristics and Microwave Absorption of Graphene Composite Materials", Materials 2016, 9, 825, pp. 1-10 (Year: 2016).*

(Continued)

*Primary Examiner* — Peter M Bythrow
(74) *Attorney, Agent, or Firm* — Westman, Champlin & Koehler, P.A.

(57) ABSTRACT

A radar level gauge comprising a signal propagation device, a dielectric filling member arranged in the signal propagation device, and a sealing arrangement for preventing tank content from escaping into the outside environment. The dielectric filling member includes a main body formed of a polymer material, and at least one structurally reinforced element formed of a modified polymer material providing, the modified polymer material being obtained by modifying the polymer material with a filler material, wherein the at least one structurally reinforced element is integrally formed with the main body by sintering, and forms part of the sealing arrangement.
The present invention is based on the realization that a structurally reinforced element, made of a modified polymer material, may be integrated into the main body by sintering.

17 Claims, 6 Drawing Sheets

(56) References Cited

U.S. PATENT DOCUMENTS

| | | | | |
|---|---|---|---|---|
| 2009/0212996 A1* | 8/2009 | Chen | ................... | G01F 23/284 |
| | | | | 342/124 |
| 2009/0262038 A1* | 10/2009 | Gerding | ............... | G01F 23/284 |
| | | | | 343/783 |
| 2010/0109963 A1* | 5/2010 | Kienzle | ................ | G01F 23/284 |
| | | | | 343/786 |
| 2014/0266864 A1* | 9/2014 | Fredriksson | ......... | G01F 23/284 |
| | | | | 342/124 |
| 2015/0276460 A1* | 10/2015 | Georgescu | ............... | G01S 7/02 |
| | | | | 342/124 |
| 2015/0362354 A1* | 12/2015 | Schultheiss | .......... | G01F 23/284 |
| | | | | 342/124 |
| 2016/0273954 A1* | 9/2016 | Bergmann | ........... | G01F 23/284 |
| 2018/0113020 A1* | 4/2018 | Fredriksson | ......... | G01F 23/284 |

OTHER PUBLICATIONS

Notification of Transmittal of the International Search Report and the Written Opinion of the International Searching Authority of PCT/EP2019/066907, dated Sep. 13, 2019.

\* cited by examiner

SEALING DIELECTRIC FILLING MEMBER WITH MECHANICALLY REINFORCED ELEMENT

FIELD OF THE INVENTION

The present invention relates to a radar level gauge having a wave guiding structure with a sealing dielectric filling member, which filling member includes a mechanically reinforced element. The present invention also related to a method for manufacturing such a dielectric filling member.

BACKGROUND OF THE INVENTION

A radar level gauge (RLG) is suitably used for making measurements of a filling level of products such as process fluids, granular compounds and other materials contained in a tank.

An example of such a radar level gauge can include transceiver circuitry for transmitting and receiving microwaves, a signal propagation device arranged to direct microwaves towards the surface and to return microwaves reflected by the surface to the transceiver, and processing circuitry adapted to determine the filling level based on a relation between microwaves transmitted and received by the transceiver.

The signal propagation device may include a hollow wave guiding structure, such as one or several hollow waveguides and a directional antenna, adapted to emit free propagating electromagnetic waves into the tank and receive a reflection of those waves. Such an RLG is sometimes referred to as a non-contact RLG. The antenna may be adapted to a specific frequency band. The currently most used frequency bands have center frequencies of around 6 GHz or 26 GHz, although higher frequency bands may also be contemplated.

Alternatively, the signal propagation device may include a microwave transmission line (often referred to as a probe) extending into the content of the tank. In this case the transmit signal and echo signal will propagate along the probe until they are reflected by the impedance discontinuity caused by the surface. An RLG with a probe is sometimes referred to as guided wave radar (GWR) level gauge. Several types of probes, for example single-line (Goubau-type), coaxial, and twin-line probes may be used. The probes may be essentially rigid or flexible and they may be made from metal, such as stainless steel, plastic, such as PTFE, or a combination thereof. The transmission line probe may be connected to a coaxial probe connection.

In case of a NCR level gauge, a dielectric filling member may be arranged in the cavity of the antenna and/or the wave guide, in order to protect the waveguide/antenna from thermal and chemical influence from the tank atmosphere. In case of a GWR level gauge, the coaxial probe connection includes a dielectric filling member between the coaxial conductors.

Such a dielectric filling member should be transmissive to microwaves, chemically resistant, preferably hydrophobic (repelling to water), and also needs to withstand temperatures and pressure which are present in the tank. Some applications, known as high-pressure, high temperature (HPHT) applications, present especially challenging conditions. One material which is often used for such filling members is PTFE, also known as Teflon®.

The dielectric filling member is typically also used as a process seal, i.e. to ensure that the tank content is not released into the outside environment. The process seal may be pressure tight. A dielectric filling member which is used also as a seal is here referred to as a "sealing dielectric filling member".

In some situations, one or several sealing elements, such as O-rings or the like, are arranged between the dielectric filling member and the surrounding structure. Typically, grooves are formed in the dielectric filling member to fixate the sealing element, thereby also providing a mechanical fixation of the sealing dielectric filling member. As an example, see U.S. Pat. No. 9,291,492. In other cases, the parts of the dielectric filling member itself acts as a sealing element. As an example, see U.S. Pat. No. 6,401,532.

There are several challenges with such sealing dielectric filing members. One potential problem is that suitable materials such as PTFE have large coefficients of thermal expansion, and will expand at elevated temperatures. The sealing of a sealing element provided between the filling member and a surrounding structure (e.g. metal) will therefore deteriorate when the filling member shrinks. Likewise, the sealing provided by the filling member itself will potentially deteriorate when the filling member shrinks.

Attempts have been made to solve this problem. For example, non-published U.S. patent application Ser. No. 15/299,976 discloses a "bucket"-type dielectric filling member where the disc-shaped portion of the bucket acts as a seal. In order to compensate any variation in thickness, the disc is placed under pressure by means of a spring-loaded clamp.

GENERAL DISCLOSURE OF THE INVENTION

It is an object of the present invention to provide an improved way of combining a dielectric filling member with one or several structurally reinforced elements.

According to a first aspect of the present invention, this and other objects are achieved by a radar level gauge, for determining a process variable of a product in a tank using electromagnetic measuring signals, comprising a signal propagation device adapted to direct a microwave transmit signal toward the product and return reflections thereof from a surface of the product, a dielectric filling member arranged in the signal propagation device to prevent entry of tank content into the signal propagation device, and a sealing arrangement for preventing tank content from escaping into the outside environment. The dielectric filling member includes a main body formed of a polymer material, and at least one structurally reinforced element formed of a modified polymer material providing, the modified polymer material being obtained by modifying the polymer material with a filler material, wherein the at least one structurally reinforced element is integrally formed with the main body by sintering, and forms part of the sealing arrangement.

According to a second aspect of the present invention, this and other objects are achieved by a method for manufacturing a dielectric filling member for a signal propagation device of a radar level gauge, including the steps of forming a main body of a polymer material, obtaining a modified polymer material by modifying the polymer material with a filler material, the modified polymer material providing a microwave attenuation of at least 1 dB/centimeter at an operating frequency of the radar level gauge, forming at least one structurally reinforced element of the modified polymer material, arranging the at least one structurally reinforced element in pressurized contact with the main body, and heating the main body and the at least one structurally reinforced element to such an extent that the at least one microwave absorbing element is sintered with the main body, wherein the at least one structurally reinforced element is designed to serve as sealing arrangement for preventing tank content from escaping into an outside environment.

The present invention is based on the realization that a structurally reinforced element, made of a modified polymer material, may be integrated into the main body by sintering. This results in one fully integrated dielectric filling member with portions having improved mechanical properties. Such portion may advantageously be used to provide improved sealing of the tank, especially under (periodic) high pressure/high temperature conditions. For example, the present invention may be used to form a dielectric filling member which has a chemically resistant surface exposed to the tank content, and a structurally strong area used to ensure satisfactory sealing. In some embodiments, the structurally reinforced element is arranged around a periphery of the main body and forms a groove for receiving a sealing element.

The element made of the modified polymer material is thus "structurally reinforced" compared to the main body made of the polymer material. By "structurally reinforced" is here intended a greater resistance to deformation when exposed to mechanical stress. One indication of mechanical resistance is the Young's Modulus, which specifies the elasticity of a material, i.e. its ability to return to its original shape after deformation. The structurally reinforced element is preferably (almost) completely elastic under relevant temperature and pressure, i.e. it will return to its original shape and form regardless of the duration of the deformation. This means that the structurally reinforced element is less susceptible to cold creeping, i.e. a process where an element after long time of deformation does not return to its original form (but instead "creeps" to a different form).

The modified polymer material preferably has a Young's Modulus of which is significantly greater (e.g. at least 50% greater, or even 100% greater, or more) than the Young's Modulus of the (pure) polymer material. As an example, PTFE has a Young's Modulus of about 0.5 GPa.

The "structurally reinforced" element may also present a greater hardness. Hardness can be expressed in Shore D, as measured according to the ASTM D 2240 standard, or in $N/mm^2$, as measured e.g. according to the DIN 53456 standard.

The "structurally reinforced" element may also present a greater temperature stability, i.e. less deformation as elevated temperatures. An indication of such temperature stability may be a smaller coefficient of temperature expansion.

As used herein, the expression "sintering" refers to a process where two elements are integrated by pressing them against each other and heating them without melting. Sintering of modified polymer materials, such as modified PTFE, is known per se. However, the present invention is based on the realization that several advantages may be achieved in the specific field of dielectric filling members to be arranged in a horn antenna in a radar level gauge, by using sintering to integrate a main body of a polymer material with one or several elements made of a modified polymer material.

More specifically, by sintering a main body of a polymer material (such as PTFE) with one or several structurally reinforced elements made of a modified polymer material (such as modified PTFE), a very reliable integration is achieved. The sintering also eliminates the need for adhesives, and fixates the microwave absorbing element(s) without additional interfaces.

The dielectric filling member is made of a dielectric material having suitable electromagnetic properties, in order not to interfere with the operation of the RLG. Further, the material should typically be hydrophobic, i.e. repel water, and preferably be chemically resistant to the content in the tank, typically petroleum products. Fluoropolymers have been found to have suitable properties, and examples of materials conventionally used as dielectric filling members in radar level gauges include PTFE (polytetrafluoroethylene), PFA (perfluoroalkoxy alkane) and FEP (fluorinated ethylene propylene). These materials have excellent chemical resistance and also have hygienic FDA-approval, i.e. they may be used also in highly hygienic processes, such as in the food industry. Of these, PTFE is the only one that can withstand high temperatures (above 150 degrees C.), and it is therefore often the preferred choice.

It is noted that the polymer material (e.g. PTFE) is not necessarily completely pure (so called "virgin" grade) but may also be mixed with small amounts of other materials in order to provide the most appropriate mechanical properties.

The filler material, which is mixed with the polymer material to form the modified polymer material, may be glass (fiber or balls), a polymer (such as PEEK), carbon (fiber or coke), metal (e.g. bronze or stainless steel), or other suitable material.

The amount of filler material needs to be sufficient to provide the desired mechanical properties, such as increased Young's modulus and/or hardness, but must be small enough to allow sintering of the modified material. As an example, the amount of filler material is at least 5% by weight, or at least 10% by weight. As a further example, the amount of filler material is no more than 45% by weight, or even no more than 30% by weight.

In some embodiments, the signal propagation device includes a hollow wave guiding structure and a cavity formed inside the wave guiding structure, and the dielectric filling member is arranged at least partly within this cavity. The hollow wave guiding structure may include a horn antenna having a waveguide section and a horn section, the cavity being formed inside the waveguide section and the horn section.

The modified polymer material may present poor dielectric properties. For example, PTFE modified with PEEK has a significantly higher dielectric constant than "pure" PTFE. In applications where the dielectric filling member is arranged in a hollow waveguide and/or antenna horn, the structurally reinforced element is therefore preferably placed outside the microwave zone, i.e. outside the area where microwaves propagate.

In one example, the main body has a substantially conical portion filling the horn section, and an annular flange extending radially from a base portion of the conical portion. The annular flange forms part of the sealing arrangement, and may be sandwiched between the tank connection and the tank flange (sometimes referred to as tank nozzle). The structurally reinforced element may then form at least part of this annular flange, making it more resistant to the applied pressure and thus providing a more reliable seal.

In another example, the main body has a center portion filling the waveguide section, and an annular collar portion extending radially from the center portion. By "annular collar portion" is intended an impermeable portion which continuously extends from the center of the filling member at least beyond the inner peripheral edge of an annular abutment in the tank connection. When pressed against the annular abutment, this collar portion can thus provide a tank seal. Such a collar portion may also have an axial extension along an axis of the center portion, so as to have e.g. a conical shape, a bowl-like shape or a bucket-like shape.

In this case, the annular collar portion forms part of the sealing arrangement, and may be sandwiched between the tank connection and one or several wave guide forming members. The structurally reinforced element may then forms at least part of this annular collar portion, making it more resistant to the applied pressure and thus providing a more reliable seal.

In other embodiments, the signal propagation device includes a coaxial coupling arrangement having a central conductor, wherein the dielectric filling member surrounds the central conductor. The signal propagation device may then further include a transmission line probe electrically connected to the coaxial coupling arrangement, which transmission line probe is configured to be suspended in the tank and extend into the product.

In this case, the main body may be a dielectric sleeve, and the at least one structurally reinforced element may include an inner sleeve arranged coaxially inside the main body. The inner sleeve may further form a groove for receiving a sealing element, which sealing element forms part of the sealing arrangement, by sealing the dielectric filling member against the central conductor.

In a similar way, the main body may be a dielectric sleeve, and the at least one structurally reinforced element may include an outer sleeve arranged coaxially outside the main body. The outer sleeve may further form a groove for receiving a sealing element, which sealing element forms part of the sealing arrangement, by sealing the dielectric filling member against the surrounding structure, e.g. the tank connection.

By forming the inner and/or outer sleeve of a structurally stronger material in which the groove is formed, the sealing effect of a sealing element received in the groove can be improved.

BRIEF DESCRIPTION OF THE DRAWINGS

The present invention will be described in more detail with reference to the appended drawings, showing currently preferred embodiments of the invention.

DETAILED DESCRIPTION OF PREFERRED EMBODIMENTS

Figure 1A:
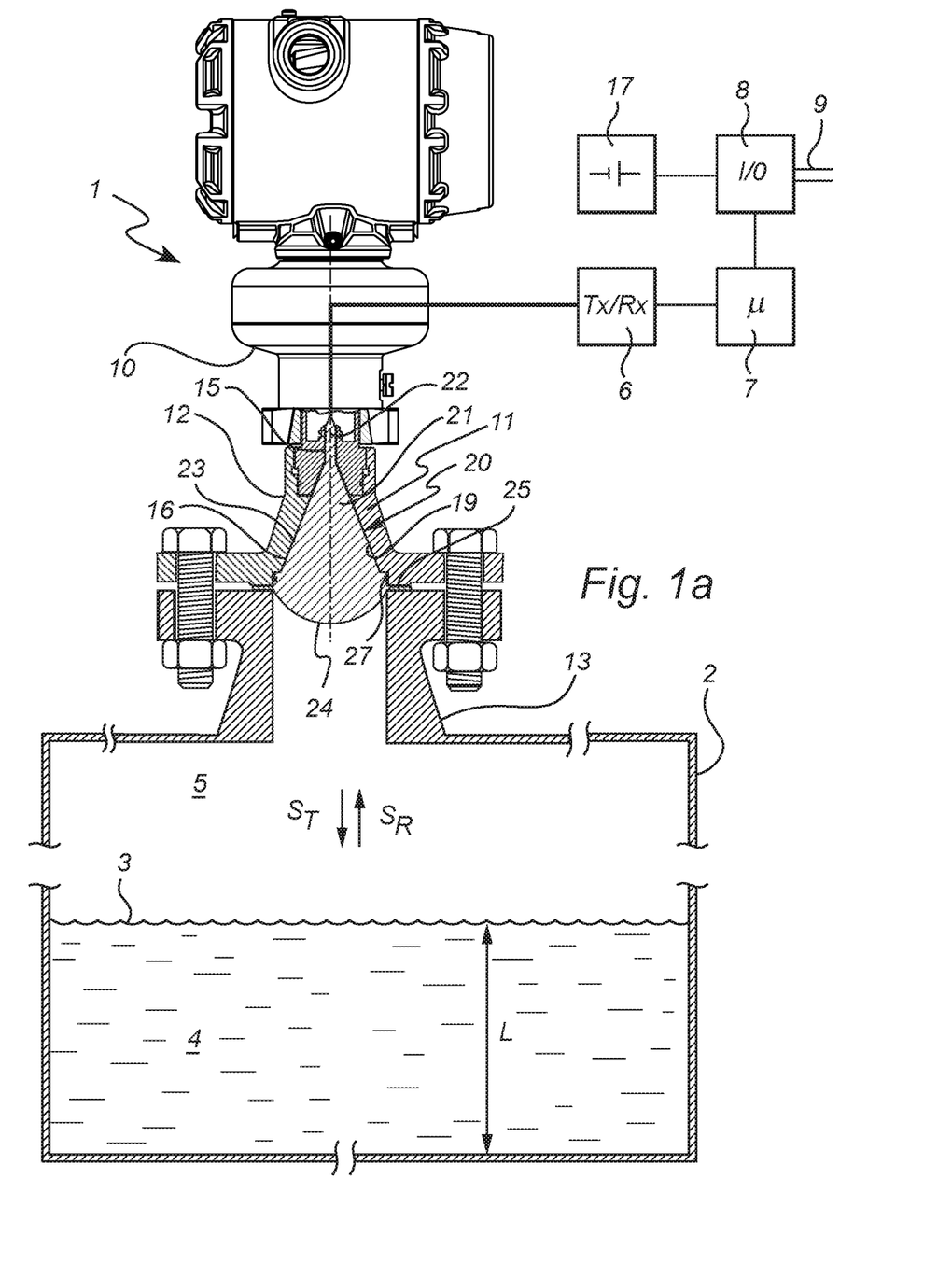
FIG. 1a shows a radar level gauge according to an embodiment of the present invention, mounted on a tank.

A radar level gauge (RLG) 1 according to an embodiment of the present invention is illustrated schematically in FIG. 1a. The RLG 1 is mounted on a tank 2, and arranged to perform measurements of a process variable such as the level L of an interface between two materials in the tank 2. Typically, the first material is a product 4 stored in the tank, e.g. a liquid such as gasoline, or a solid such as a granular compound, the second material is air or other atmosphere 5 in the tank, while the interface is the surface 3 of the product 4. In some applications, the tank is a very large metal tank (diameter in the order of ten meters).

The radar level gauge 1 includes transceiver circuitry 6, processing circuitry 7 and a signal/power interface 8, illustrated very schematically in FIG. 1. The transceiver circuitry 6, processing circuitry 7 and interface 8 are arranged in a measurement unit (MU) 10 mounted to a tank connection 12 made of a metal material, typically steel, which is adapted to be securely fitted (e.g. bolted or welded) to a tank flange 13. The tank connection 12 is adapted to provide a passage (sometimes pressure sealed) for electromagnetic signals through the wall of the tank, which passage connects the transceiver circuitry 6 with a signal propagation device, for allowing signals to propagate into the tank.

The signal propagation device includes a wave guiding structure, here a directional antenna 11 with a waveguide section 15 and a horn section 16. The horn section 16 is here formed by the tank connection 12, but may also be a separate part attached to the tank connection 12, e.g. by means of a threaded fitting.

The transceiver circuitry 6 is configured to generate and transmit an electromagnetic (microwave) transmit signal $S_T$ and receive an electromagnetic (microwave) return signal $S_R$. A coupling arrangement, such as a probe (not shown), is arranged to couple the transmit signal from the transceiver circuitry 6 into the waveguide section 15.

The transceiver circuitry 6 may be one functional unit capable of transmitting and receiving electromagnetic signals, or may be a system comprising separate transmitter and receiver units. The elements of the transceiver circuitry 6 are typically implemented in hardware, and form part of an integrated unit normally referred to as a microwave unit. For simplicity, the transceiver circuitry is referred to as the "transceiver" in the following description.

The processing circuitry 7 is configured to determine the distance between a reference position at the top of the tank (such as the passage between the outside and the inside of the tank) and the surface 3 by analyzing the transmit signal $S_T$ and the return signal $S_R$. The processing typically includes generation of a tank signal or "echo curve", including a plurality of peaks representing echoes from the interior of said tank. One of the peaks represent an echo from the surface 3. Based on the determined distance to the surface 3, generally referred to as ullage, and known dimensions of the tank 5, a process variable such as the filling level L of the tank can be deduced.

The processing circuitry 7 may include a combination of analogue processing realized in hardware, and digital processing realized embodied by software modules stored in a memory and executed by an embedded processor. The invention is not restricted to the particular realization, and any implementation found suitable to realize the herein described functionality may be contemplated.

The interface 8 is configured to allow communication of a measurement value externally of the RLG and optionally for power supply of the RLG. For example, the interface 8 may be a two-wire control loop 9, such as a 4-20 mA loop. The interface 8 may also include a serial data bus, allowing communication using a digital communication protocol. Examples of available digital protocols include HART, Modbus, Profibus and Foundation Fieldbus. The interface 8 may also be a wireless interface, employing e.g. wireless HART, in which case the RLG is provided with some sort of internal energy store, such as a battery 17, possibly solar powered.

In use, the transmit signal $S_T$ generated by the transceiver is coupled into the waveguide section 15, allowed to propagate to the horn section 16 and then emitted into the tank. The transmit signal is here a high frequency signal, with an operating frequency range greater than 1 GHz. Typically, the operating frequency range is centered around 6 GHz or 26 GHz, with a band-width of one or several GHz. The transmit signal $S_T$ is propagated towards the surface 3 of the product 4 and the electromagnetic return signal $S_R$ is caused by a reflection in the surface 3. The return signal is returned by the antenna 11, allowed to propagate through the waveguide section and is coupled back to the transceiver by the coupling arrangement. In other words, the directional antenna 11 is arranged to act as an adapter, transmitting free propagating electromagnetic waves into the tank 2 to be reflected by the interface, here the surface 3 of the product 4 in the tank 2. An RLG with a directional antenna is often referred to as a non-contact radar (NCR) level gauge.

According to one measuring principle, the transmit signal is a continuous signal with varying frequency (frequency modulated continuous wave, FMCW). An FMCW based RLG will emit a radar sweep with gradually varying frequency, and mix the received signal with the original signal (homodyne mixing) to form a frequency domain tank signal.

According to another measurement principle, the transmit signal is a train of distinct pulses with a duration in the order of ns and a repletion frequency in the order of MHz. The return signal is sampled with the original pulse train in a sample and hold circuit in a process known as time domain reflectometry (TDR), thereby forming a time domain tank signal. When time domain reflectometry is used in a NCR level gauge, the pulses need to be frequency modulated to allow emission with the directional antenna.

The transmit signal may also be some combination of FMCW and a pulsed signal. For example, a principle known as multiple frequency pulsed wave (MFPW) has been proposed.

In case of a frequency domain tank signal, the amplitude of the tank signal is expressed as a function of frequency, where the frequency is related to the distance from the reference position. In case of a time domain tank signal, the amplitude of the tank signal is expressed as a function of time, where the time is related to the distance from the reference position.

Figure 1B:
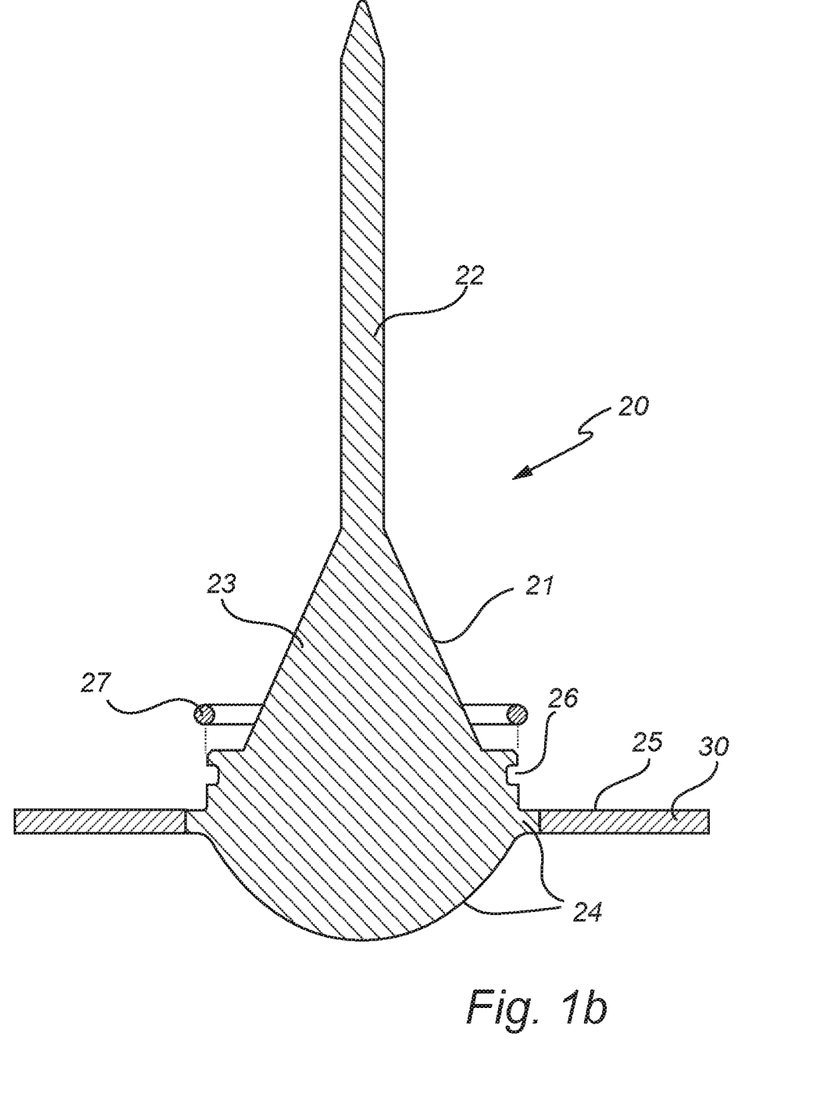
FIG. 1b shows a cross-section of the dielectric filling member in FIG. 1a in more detail.

A microwave transmissive dielectric filling member 20, shown more clearly in FIG. 1b, is arranged at least partly within the cavity 19 formed by the waveguide section 15 and the horn section 16. The filling member 20 serves to protect the antenna horn against thermal and chemical impact of the tank atmosphere 5. The filling member 20 is preferably made of a chemically resistant and water repellant material, such as a fluoropolymer. In the present example, the polymer material is PTFE (Teflon®), chosen for its temperature resistance.

With reference to FIG. 1b, the filling member 20 here has a cylindrical portion 22 adapted to fit in the waveguide section 15, and a conical portion 23 adapted to fit in the horn section 16. The base 24 of the conical portion, i.e. the surface facing the interior of the tank, may have a convex shape in order to shape the radar beam of emitted waves in a beneficial manner, and also promote dripping of condensate formed on the filling member.

The filling member 20 may further be provided with a groove 26 extending around the periphery of the conical portion 22. The groove is adapted to receive a ring-formed sealing element 27, such as an O-ring. An O-ring may also be employed to mechanically fixate the filling member 20 in the cavity 19.

In order to seal the tank, the filling member 20 may be provided with an annular flange 25 (sometimes referred to as a gasket), protruding from where the convex base 24 meets the conical portion 23. When the LRG 1 is mounted to the tank, the flange 25 is sandwiched between the tank connection 12 and the tank flange 13, thereby providing a sealing of tank 2 and cavity 19. Such sealing is often referred to as a "tank seal" or a "process seal".

According to an embodiment of the present invention, the member 20 is formed by a main body 21 and a structurally reinforced element 30. Here, the element 30 is an annular disc which forms the flange 25.

Figure 2:
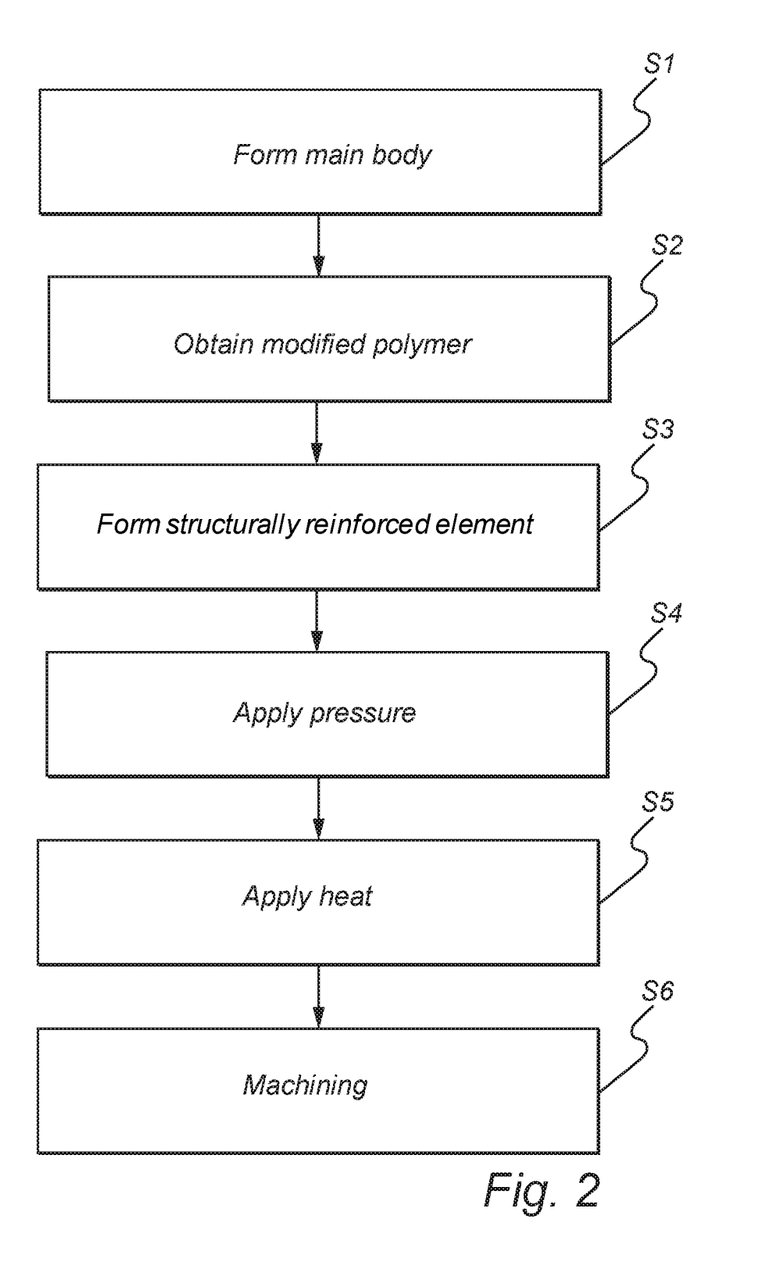
FIG. 2 is a flow chart of a method for manufacturing a dielectric filling member according to an embodiment of the invention.

With reference to FIG. 2, the dielectric filling member 20 is manufactured by the following process.

First, in step S1, the main body 21 is formed of a first polymer material having suitable properties, here PTFE. The first polymer material may be substantially pure (virgin PTFE), but may alternatively be a modified PTFE, i.e. PTFE mixed with a certain fraction of a non-polymer material such as glass, in order to provide suitable mechanical properties.

When using PTFE, the main body is typically formed by first forming a blank having an appropriate basic shape by means of compression molding, and then machining this blank to its final shape. Compression molding of PTFE includes filling a PTFE resin (powder) into a die cavity of relatively simple shape, and then compressing the die using a hydraulic press. As mentioned, in order to provide appropriate mechanical properties, the PTFE resin may be mixed with small amounts of particles, such as glass particles. Details of compression molding, as well as other molding processes, are known in the art. The molded (and possibly machined) blank is allowed to rest for up to a few days, in order for any air trapped in the molded blank to escape.

In step S2, a modified polymer material is obtained by mixing a polymer resin, e.g. PTFE resin, with a filler material, typically in powder form. The filler material is chosen such that the modified polymer material has a greater structural strength than the first polymer material, i.e. is less susceptible to deformation, e.g. having greater hardness or elasticity. For example, the modified polymer material may have a Young's Modulus which is at least 50% greater, or even 100% greater, or more, than that of the first polymer. For reference, PTFE has a Young's Modulus of about 0.5 GPa.

As an example, the filler material may be a suitable polymer, such as PEEK (polyether ether ketone), glass fiber, or carbon. Also other materials, including metal particles, are possible.

The fraction of filler material will depend on the filler material and the desired properties. Most importantly, the fraction must be large enough to obtain the required mechanical strength (e.g. Young's Modulus), and small enough to allow sintering of the modified polymer material with the polymer material. As an example, the fraction of filler material for non-metal materials may be in the range 5-40% by weight. For metal materials (which are heavier) the fraction of filler material maybe in the range 40-60% by weight.

The following table shows examples of filler materials and suitable mixing fractions.

| Properties | Glass (fiber/ balls) | Polymer (PEEK) | Soft carbon | Coke- carbon | Carbon fiber | Bronze (irregular particles) | Stainless steel (irregular particles) |
|---|---|---|---|---|---|---|---|
| Mixing fraction (min) (by weight) | 10% | 10% | 10% | 10% | 10% | 40% | 50% |
| Mixing fraction (max) (by weight) | 40% | 25% | 35% | 35% | 15% | 60% | 60% |

In step S3, a structurally reinforced element 30 (here an annular disc intended to form the flange 25) is formed of the modified polymer material. The element 30 may be formed using a similar technique as that used for forming the main body 21, e.g. compression molding and appropriate machining. It may also be formed by sintering.

In step S4 pressure is applied by arranging the element 30 in pressurized contact with the main body 21, and in step S5 heat is applied such that the structurally reinforced element 30 is sintered with the main body. As mentioned above, sintering here refers to an integration without melting. Although the steps of applying pressure and temperature are here illustrated as separate steps, it is noted that pressure continues to be applied also in step S5, such that pressure and temperature are applied simultaneously in order to achieve integration by sintering. The sintering cycle—i.e. the sequence of temperatures and durations—may be as long as 10 hours or more, even up to or exceeding 50 hours, depending on the size of the element 30.

After the element 30 has been sintered with the main body, additional machining may be required in step S5 for the dielectric filling member 20 to take on its final shape.

Figure 3A:
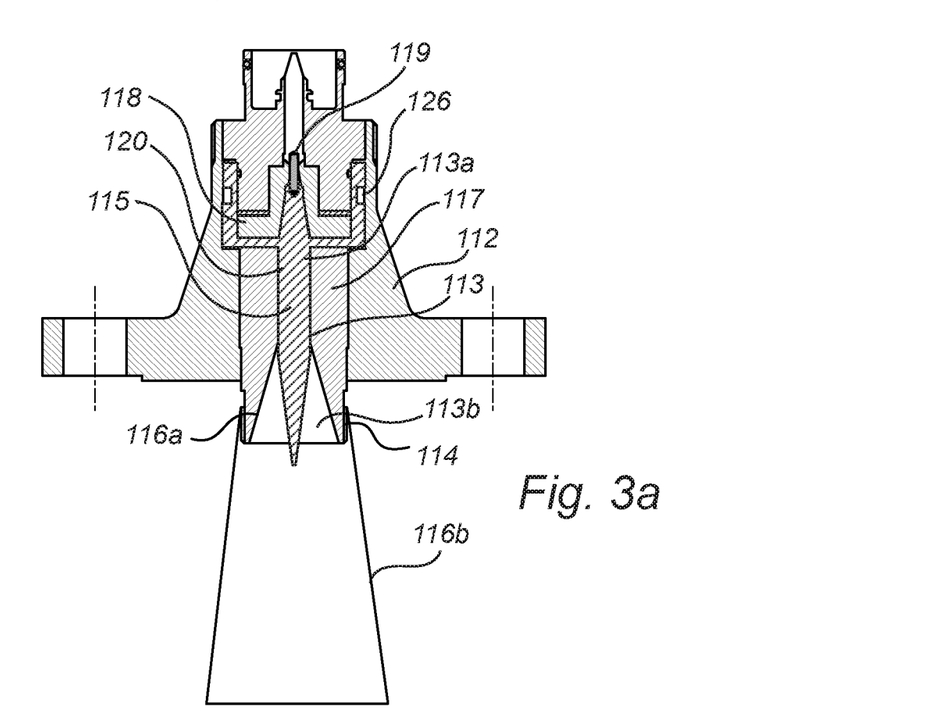
FIG. 3a is a cross section view of a tank connection of a non-contact radar level gauge according to an embodiment of the invention.

FIG. 3a shows a further embodiment of a tank connection 112 for a non-contact RLG. The tank connection 112 has a central channel 113 forming part of a wave guiding structure. A cylindrical part 113a of the channel 113 forms a wave guide section 115, while a lower, outwardly tapered part 113b of the channel 113 forms an upper part 116a of the horn section. A lower part 116b of the horn section is here formed by a separate conical part attached to a fitting 114 of the tank connection 112. In some applications, the inner diameter of the channel 113 is adapted using a tank connection adaptor 117.

A dielectric filling member 120 is arranged in the waveguide section 115. The filling member 120, which is shown in more detail in FIG. 3b, has a central, cigar-shaped portion 122 and an annular collar portion 125. In the illustrated case, the collar portion 125 has a bucket-shape with a disc-shaped portion 125a and a cylindrical portion 125b. The bucket-shaped collar portion 125 here has an opening facing away from the tank interior, but in other embodiments it may face towards the tank interior. The central portion 122 has a tapered lower end 122a which extends into the tapered portion 113b of the channel 113. Details and benefits with such a "bucket" design of the filling member 120 are discussed in U.S. Pat. No. 9,212,941, hereby incorporated by reference.

The filling member 120 is held in place by an outer wave guide forming member 118, typically made of the same electrically conducting material as the tank connection 112. The member 118 has an opening 100 through which a connection pin 119 extends. The pin 119 held in place by the metal element 118 serves to prevent that a relatively soft dielectric wave guide filling member 120 is forced out of the channel 113 by the pressure inside the tank, in particular during conditions of elevated temperatures.

Figure 3B:
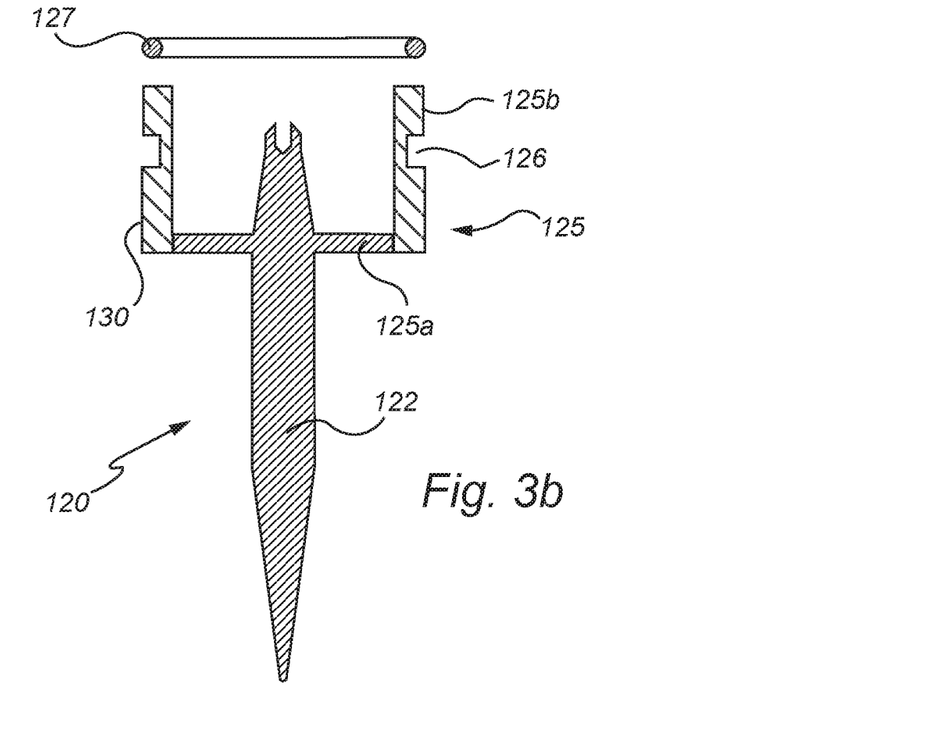
FIG. 3b is a cross section view showing the dielectric filling member in FIG. 3a in more detail.

With reference to FIG. 3b, the cylindrical part 125b of the collar portion 125 forms a groove 126 for receiving a sealing element such as an O-ring 127. The sealing element provides sealing of the tank. In order to provide a more reliable sealing, the cylindrical part 125b is here formed by a structurally reinforced element 130, which has been attached to the central portion (main body) 122 by sintering. The choice of materials and sintering process is the same as discussed above with reference to FIG. 2.

It is important to note that the structurally reinforced element 130 (i.e. here the cylindrical part 125b), may have different wave guiding properties than the main body of the filling member (i.e. the central portion 122). It is therefore preferred that the structurally reinforced element is located outside the microwave zone, i.e. at a radial distance from the waveguide section 115 where the microwaves will not penetrate. The dielectric properties of the element 130, here forming part of the collar portion 125, are therefore not detrimental to the performance of the radar level gauge.

FIGS. 4a-b and 5a-b illustrate two types of tank connections for radar level gauges where the signal propagation device 10 includes a probe 12, i.e. a transmission line extending into the content of the tank. In this case the transmit signal and echo signal will propagate along the probe until they are reflected by the impedance discontinuity caused by the surface 3. An RLG with a probe is sometimes referred to as guided wave radar (GWR) level gauge. Several types of probes, for example single-line (Goubau-type), coaxial, and twin-line probes may be used. The probes may be essentially rigid or flexible and they may be made from metal, such as stainless steel, plastic, such as PTFE, or a combination thereof.

The upper end of the probe is attached to the roof of the tank, and connected to the transceiver via a sealed tank feed through. This tank feed through, which also can be considered to form part of the signal propagation device, is typically filled by a dielectric filling member which provides a tank seal.

Figure 4A:
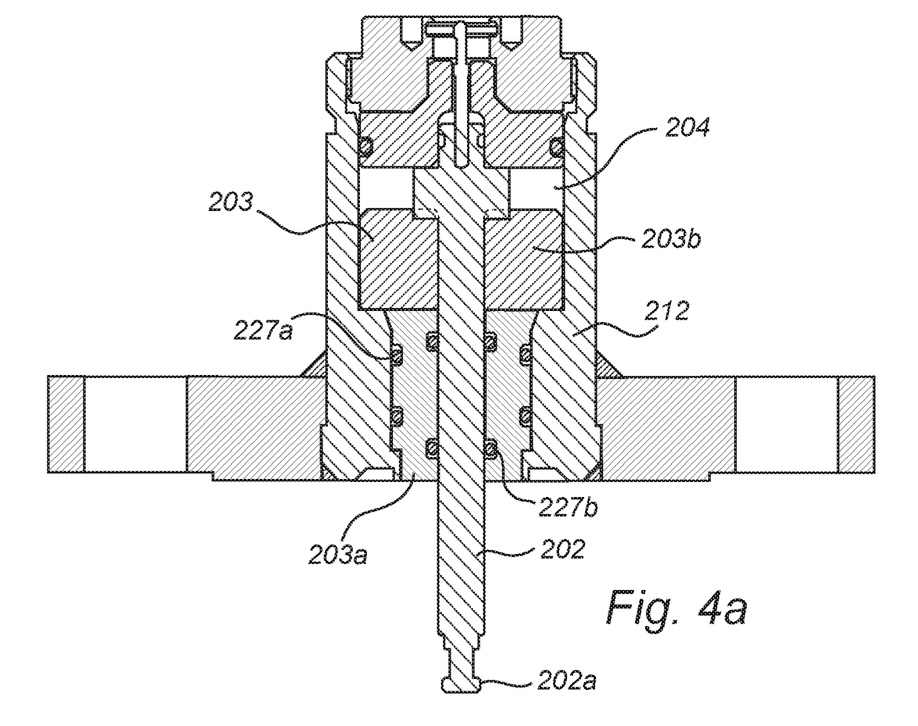
FIG. 4a is a cross section view of a tank connection of a guided wave radar (GWR) level gauge according to an embodiment of the invention.
Figure 4B:
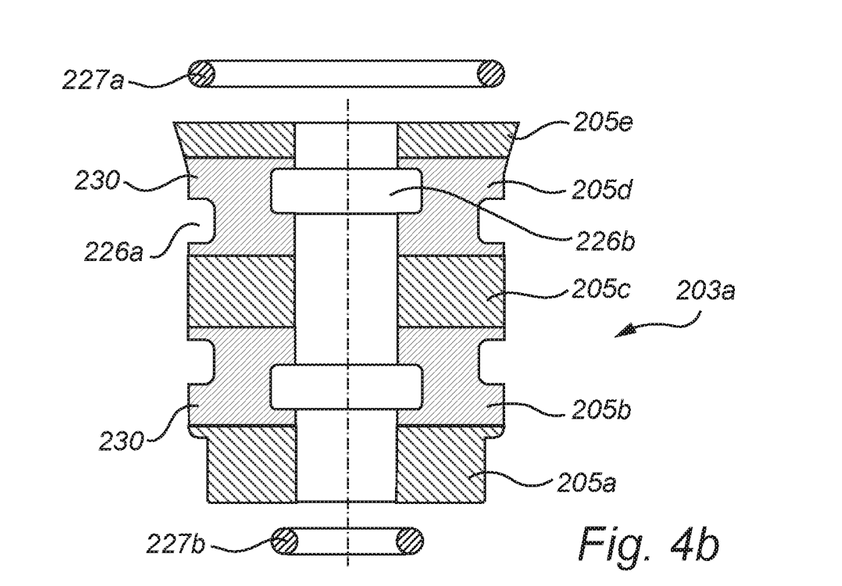
FIG. 4b is a cross section view showing the dielectric filling member in FIG. 4a in more detail.

FIG. 4a shows a first example of a tank connection 212 for a probe. The probe is not shown in FIG. 4a, but is intended to be connected to the lower end 202a of an electrically conducting probe connector 202. The probe connector 202 is suspended by a dielectric sleeve 203, which is fitted in the central opening 204 of the tank connection 212. The sleeve 203 is here formed by two separate pieces, an inner (lower) sleeve 203a and an outer (upper) sleeve 203b. The inner dielectric sleeve 203a is in contact with the tank interior, and is therefore typically made of a chemically resistant material such as PTFE.

The inner sleeve 203a is formed with grooves 226a on its outside and 226b on its inside for receiving sealing elements such as O-rings 227a and 227b respectively. The sealing elements provide sealing of the tank, both along the probe connector 202 and along the inside of the tank connection 212.

In order to provide a more reliable sealing, the parts of the sleeve 203a forming the grooves 226a and 226b is here formed by one or several structurally reinforced elements 230. In the example illustrated in FIG. 4b, the sleeve 203a is formed by five annular members 205a-e. The innermost annular member 205a, the middle annular member 205c, and the uppermost annular member 205e are all made of a first polymer material, while the intermediate annular members 205b and 205d are the structurally reinforced elements 230 made of a modified polymer material. The five annular members 205a-e are sintered together to form the sleeve 203a. The choice of materials and sintering process is analogous to that discussed above with reference to FIG. 2.

Figure 5A:
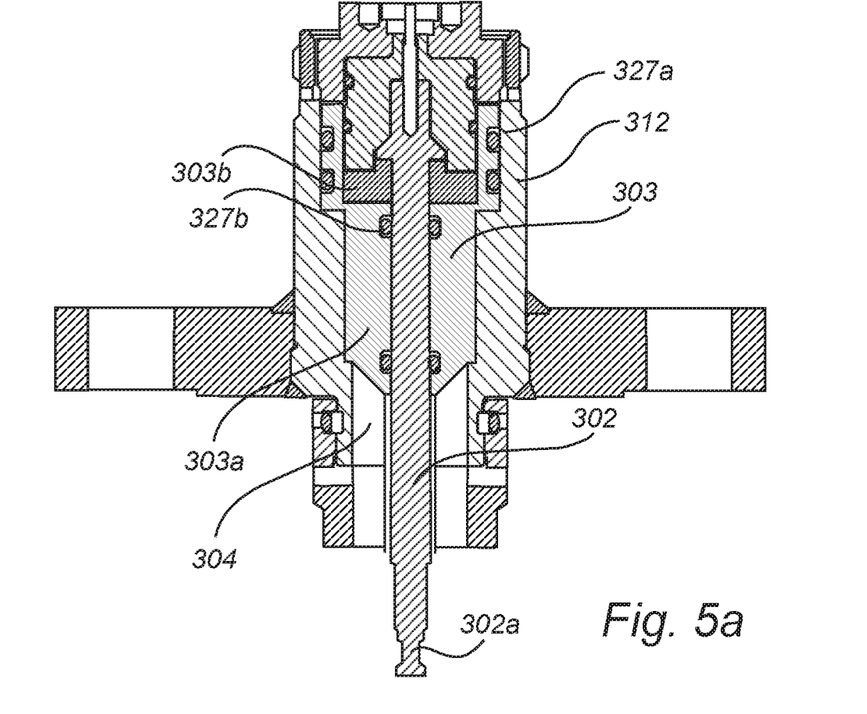
FIG. 5a is a cross section view of a tank connection of a guided wave radar (GWR) level gauge according to an embodiment of the invention.

FIG. 5a shows a second example of a tank connection 312 for a probe. Again, the probe is not shown in FIG. 5a, but is intended to be connected to the lower end 302a of an electrically conducting probe connector 302. The probe connector 302 is suspended by a dielectric sleeve 303, which is fitted in a central opening 304 of the tank connection 312. The sleeve 303 is here formed by two separate pieces, an inner (lower) piece 303a and an outer (upper) piece 303b. The inner dielectric piece 303a is in contact with the tank interior, and is therefore typically made of a chemically resistant material such as PTFE. The outer piece 303b is typically made of a structurally stronger material, in order to withstand pressure without being deformed.

The inner piece 303a is here formed as two coaxial but axially displaced sleeves. The inner piece 303a is formed with grooves 326a on its outside and 326b on its inside for receiving sealing elements such as O-rings 327a and 327b respectively. The sealing elements provide sealing of the tank, both along the probe connector 302 and along the inside of the tank connection 312.

In order to provide a more reliable sealing, the parts of the piece 303a forming the grooves 326a and 326b are here formed by structurally reinforced elements 330a and 330b. In the example illustrated in FIG. 5b, the inner piece 303a is formed by a main body in the form of a dielectric sleeve 305, and two structurally reinforced sleeves 330a and 330b. The first, outer sleeve 330a forms a radially and axially extending collar portion. The second, inner sleeve 330b forms an inner lining of the main body dielectric sleeve 305. The three sleeves 305, 330a and 330b are sintered together to form the inner piece 303a of the filling member 303. The choice of materials and sintering process is analogous to that discussed above with reference to FIG. 2.

Figure 5B:
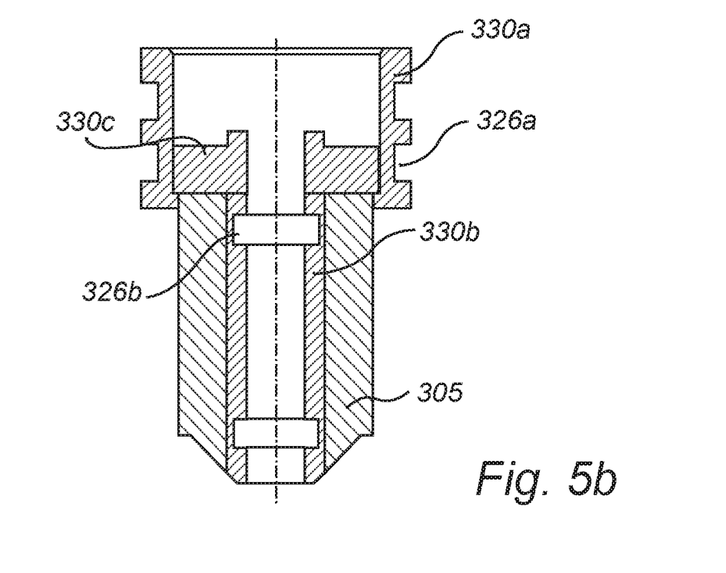
FIG. 5b is a cross section view showing the dielectric filling member in FIG. 5a in more detail.

Additionally, also the outer piece 303b of the dielectric sleeve 303, which is conventionally formed as a separate part, is here formed as another structurally reinforced element 330c, which also may be sintered together with the main body 305 and the structurally reinforced elements 330a and 330b. Alternatively, two of the structurally reinforced elements 330a, 330b and 330c, or even all three, may be integrally formed before being sintered to the main body 305.

It is noted that the structurally reinforced element 330c does not form part of any sealing arrangement, but rather forms a rigid part of the dielectric filling member, ensuring a fixed position of the filling member. This application is a separate application of the inventive concept, although not covered by the present claims. This application is not surrendered, but may be made the subject of a future divisional application.

The person skilled in the art realizes that the present invention by no means is limited to the preferred embodiments described above. On the contrary, many modifications and variations are possible within the scope of the appended claims. For example, the shape and form of the filling member and the structurally reinforced elements may be different than the illustrated examples, depending on the exact application.

What is claimed is:

1. A radar level gauge, for determining a process variable of a product in a tank using electromagnetic measuring signals, comprising:
    a signal propagation device adapted to direct a microwave transmit signal toward said product and return reflections thereof from a surface of said product;
    a dielectric filling member arranged in said signal propagation device to prevent entry of tank content into the signal propagation device; and
    a sealing arrangement for preventing tank content from escaping into the outside environment;
    said dielectric filling member including:
        a main body formed of a polymer material, and
        at least one structurally reinforced element formed of a modified polymer material providing, said modified polymer material being obtained by modifying said polymer material with a filler material,
        wherein said at least one structurally reinforced element is integrally formed with said main body by sintering, and forms part of said sealing arrangement,
    wherein said signal propagation device includes a hollow wave guiding structure and a cavity formed inside said wave guiding structure, and wherein said dielectric filling member is arranged at least partly within said cavity,
    wherein said hollow wave guiding structure includes a horn antenna having a waveguide section and a horn section, said cavity being formed inside said waveguide section and/or said horn section,
    wherein said main body has a center portion filling said waveguide section, and an annular collar portion extending radially from said center portion,
    wherein said structurally reinforced element forms at least part of said annular collar portion, and is located radially outside a microwave zone of said waveguide section.

2. The radar level gauge according to claim 1, wherein said polymer material is a fluoropolymer, preferably PTFE.

3. The radar level gauge according to claim 1, wherein said filler material is selected from the group consisting of glass fiber, PEEK, carbon and metal particles.

4. The radar level gauge according to claim 1, wherein said filler material constitutes at least 5% by weight of the modified polymer material.

5. The radar level gauge according to claim 1, wherein said filler material constitutes at least 10% by weight of the modified polymer material.

6. The radar level gauge according to claim 1, wherein said filler material constitutes less than 45% by weight of the modified polymer material.

7. The radar level gauge according to claim 1, wherein said filler material constitutes less than 30% by weight of the modified polymer material.

8. The radar level gauge according to claim 1, wherein said at least one structurally reinforced element is arranged around a periphery of said main body and forms a groove for receiving a sealing element.

9. The radar level gauge according to claim 1, wherein said collar portion also has an axial extension along an axis of the center portion.

10. The radar level gauge according to claim 9, wherein the collar portion is bucket-shaped, with a disc-shaped portion extending radially out from the center portion, and a cylindrical portion coaxial with the center portion.

11. A method for manufacturing a dielectric filling member for a signal propagation device of a radar level gauge, including the steps:

forming a main body of a polymer material, obtaining a modified polymer material by modifying said polymer material with a filler material, said modified polymer material providing a microwave attenuation of at least 1 dB/centimeter at an operating frequency of the radar level gauge, forming at least one structurally reinforced element of said modified polymer material, arranging said at least one structurally reinforced element in pressurized contact with said main body, and heating said main body and said at least one structurally reinforced element to such an extent that said at least one microwave absorbing element is sintered with said main body, wherein said at least one structurally reinforced element is designed to serve as sealing arrangement for preventing tank content from escaping into an outside environment, wherein said main body has a center portion filling a waveguide section of said signal propagation device, and an annular collar portion extending radially from said center portion, wherein said structurally reinforced element forms at least part of said annular collar portion, and is located radially outside a microwave zone of said waveguide section.

12. The method according to claim 11, wherein said polymer material is a fluoropolymer, preferably PTFE.

13. The method according to claim 11, wherein said filler material is selected from the group consisting of glass fiber, PEEK, carbon and metal particles.

14. The method according to claim 11, wherein said filler material constitutes at least 5% by weight of the modified polymer material.

15. The method according to claim 11, wherein said filler material constitutes at least 10% by weight of the modified polymer material.

16. The method according to claim 11, wherein said filler material constitutes less than 45% by weight of the modified polymer material.

17. The method according to claim 11, wherein said filler material constitutes less than 30% by weight of the modified polymer material.

* * * * *